July 5, 1927.
R. A. DALLUGGE
1,634,571
APPARATUS FOR TELEVISION
Filed May 29, 1922
2 Sheets-Sheet 1
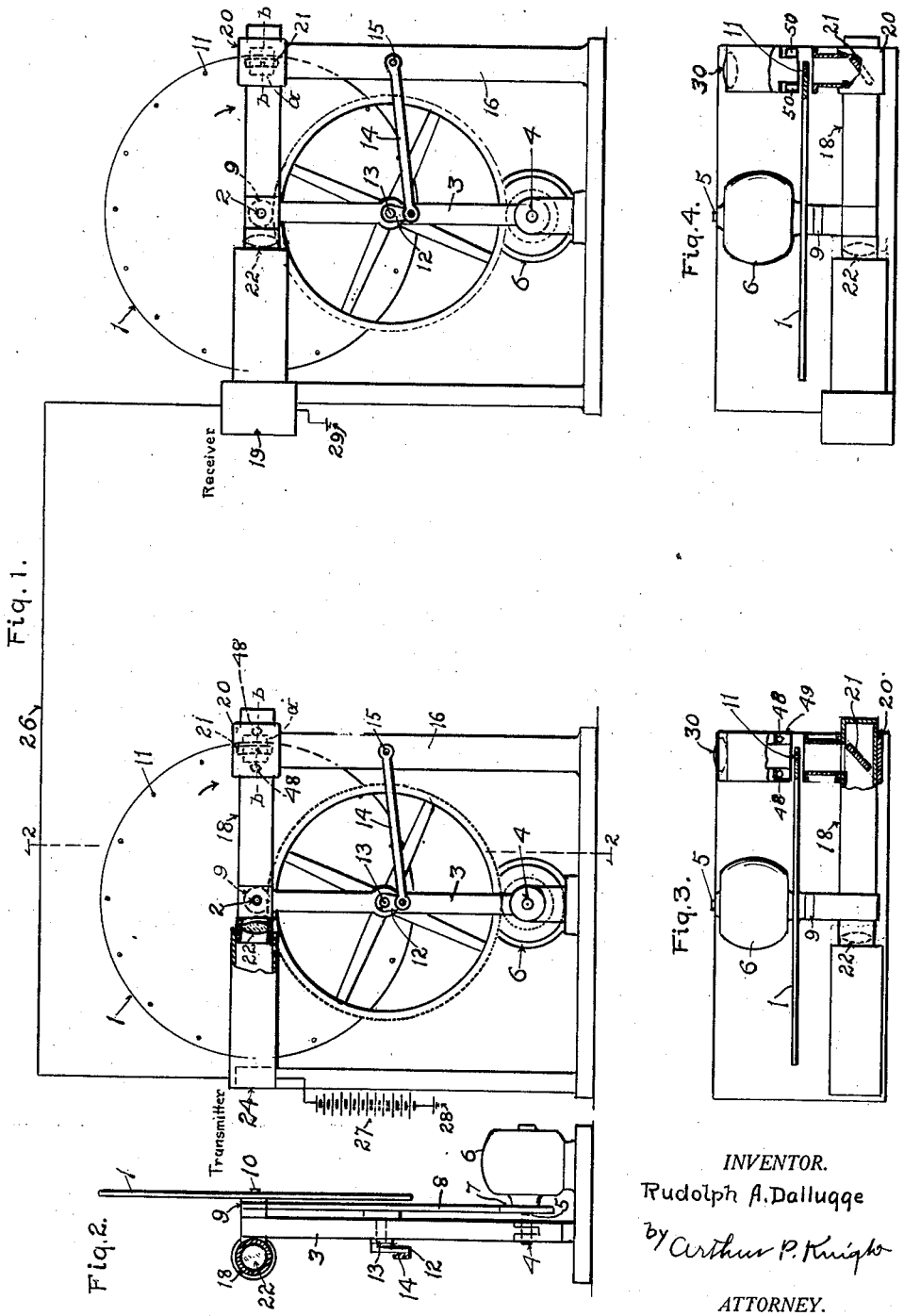
INVENTOR.
Rudolph A. Dallugge
by Arthur P. Knight
ATTORNEY.

July 5, 1927.  R. A. DALLUGGE  1,634,571
APPARATUS FOR TELEVISION
Filed May 29, 1922   2 Sheets-Sheet 2
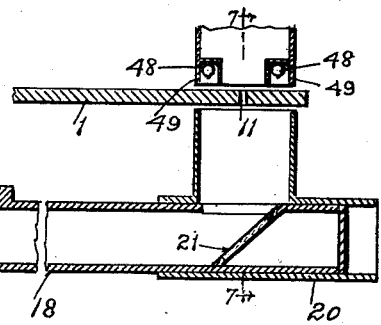
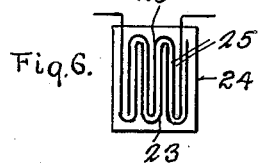
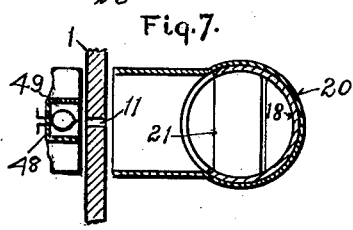
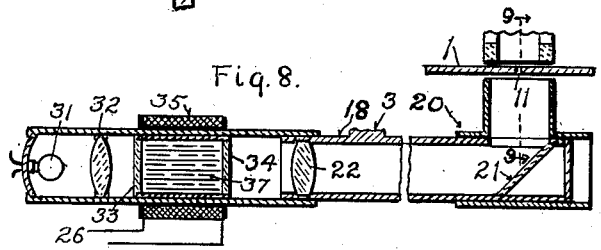
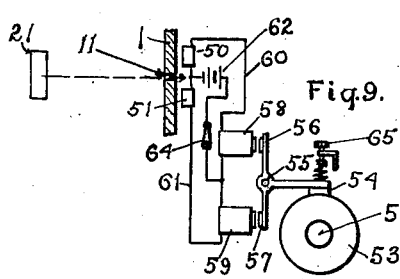
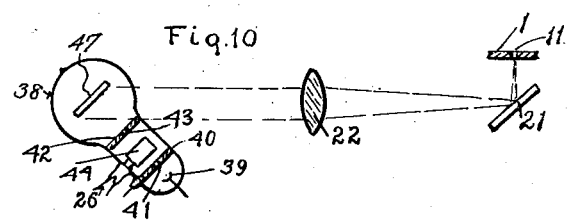
INVENTOR.
Rudolph A. Dallugge
BY Arthur P. Knight
ATTORNEY.

Patented July 5, 1927.

1,634,571

UNITED STATES PATENT OFFICE.

RUDOLPH A. DALLUGGE, OF LOS ANGELES, CALIFORNIA.

APPARATUS FOR TELEVISION.

Application filed May 29, 1922. Serial No. 564,384.

This invention relates to the transmission of scenes, particularly those involving motion of visual objects, and the main object of the invention is to reproduce the visual effect of such scenes at a distant point and in a simple and effective manner.

The accompanying drawings illustrate embodiments of my invention and referring thereto: Fig. 1 is a diagram showing the transmitting and receiving apparatus and the electrical connections thereof. Fig. 2 is a vertical section on line 2—2 in Fig. 1. Fig. 3 is a partly broken plan view of the transmitting apparatus. Fig. 4 is a partly broken plan view of the receiving apparatus. Fig. 5 is a horizontal section of a portion of the transmitter. Fig. 6 is a front elevation of a selenium cell such as may be used in the transmitter. Fig. 7 is a section on line 7—7 in Fig. 5. Fig. 8 is a partial horizontal section of one form of receiving apparatus. Fig. 9 is a section on line 9—9 in Fig. 8. Fig. 10 is a partial horizontal section showing a modified form of receiving apparatus.

Referring to Fig. 1, the transmitting apparatus and receiving apparatus therein shown are of similar construction, each comprising a movable member formed, for example, as a disc 1 mounted to rotate on a shaft 2 carried by an arm 3, which is pivoted on a fixed support at 4, the said fixed support being concentric with the shaft 5 of a motor 6. Said shaft 5 carries a pinion 7 engaging a gear wheel 8 which is journalled in a bearing on arm 3 and engages a pinion 9 on the shaft 10 of disc 1 so that the operation of said motor will rotate the disc 1 at high velocity, while permitting a swinging movement of the arm 3. Any other suitable means may be used for operating the disc 1 at suitable high speed. Disc 1 is provided with a multiplicity of minute apertures, formed, for example, as pin holes, or as slits or other perforations, indicated at 11, these apertures sweeping over or covering the field of view of the apparatus in the rotative and swinging motions of the disc or movable member. Such swinging motion may be effected by any suitable means; for example, by means of a crank 12 connected to the shaft 13 of the wheel 8 aforesaid and pivotally connected to a link 14 which is pivoted at 15 to a fixed support 16, so that in the rotation of the wheel 8 the crank 12 will operate to swing the arm 3, and the disc 10 carried thereby, backward and forward during a period which is a large multiple of the period of rotation of the disc 10. By suitable means hereinafter described, the transmitting apparatus and receiving apparatus are caused to operate, in synchronism, the motors 6 of the respective apparatus, being so controlled that the apertures 11 in each disc pass a given point in the field of view of each apparatus at approximately the same instant.

Each apparatus also preferably includes an arm 18 pivotally mounted on shaft 2 on the swinging arm 3, said arm 18 being guided in horizontal guide 20 and being provided with a reflector 21 back of the portion of the disc 1, containing the apertures 11. Said arm 18 is shown as a tube, but may be of any other suitable construction. A lens 22 carried by said arm 18 serves to control light rays passing to or from the reflector 21 in a manner hereinafter set forth, said reflector being preferably concentric with the axis of rotation of the disc 1, and the lens 22 being so located and constructed that all rays passing through the apertures 11 will also traverse said lens. Said arm 18 is mounted on the same shaft as the disc 1, said arm together with reflector 21 and lens 22 carried thereby is caused to oscillate with said disc in the operation of the device.

The transmitter apparatus further comprises a transmitter proper indicated at 24 and consisting of a photoelectric device, for example, a selenium cell as in Fig. 6 and comprising conductors 23 connected in an electric circuit and separated by selenium indicated at 25. Such photoelectric device may be directly connected to the transmitting line indicated at 26, or it may be connected to an amplifying or relay means for increasing the current strength or the voltage of the electrical current passing through the transmitting line under control of the transmitter. Instead of a selenium cell any other suitable photoelectric device may be used; for example, a photoelectric device such as described by Kunz and Stebbins, in "Physical Review" 2nd series, Vol. VII, page 62, 1916.

The receiving apparatus comprises, in addition to the apparatus above described, a receiver proper indicated at 19 and consisting of means for producing visual or light impulses in correspondence with the current impulses coming over the line, said receiver being connected to the transmitting line 26 and a suitable source of current such as a battery or generator 27 being connected to either the receiver or transmitter, the circuit being complete through ground connections indicated at 27 and 28. If desired, alternating current may be used for transmission, provided the frequency of same is considerably greater than the frequency of exposure of apertures 11, as hereinafter described.

In order to reproduce at a receiving station the visual object which is being exposed at the transmitting station, a lens 30 may be provided at the receiving station for receiving the light passing through the apertures 10 and focusing it, for example, on a suitable screen not shown, or the field of view, if the apparatus may be viewed directly by the eye. Similarly a lens 30 may be provided at the transmitting station to project a view or scene on to the field of view of the transmitting apparatus. For the receiver 19 any suitable receiving means may be used, for example, I may provide a receiving means such as shown in Fig. 8, the same comprising a source of light indicated at 31, a lens 32 for directing the rays from such source of light in a parallel beam, a polarizer 33 consisting, for example, of a Nicol's prism, another Nicol's prism or analyzer 34, also located in the path of the said beam of light and means for acting magnetically on the beam in its passage between devices 33 and 34 to rotate the plane of polarization of the light. For this purpose, a body 37 of suitable material such as a tube containing carbon bisulfide, or a prism of lead glass, is interposed in the path of the beam passing from the polarizer 33 and a coil or helix 35 is wound around said tube or body and is connected to the transmitting circuit 26 or to the circuit of a relay or amplifier controlled by such circuit. With such a construction and with the Nicol's prisms 33 and 34 properly adjusted so that the device 34 will stop the light polarized by the device 33, the current passing through the helix 35 will effect rotation of the plane of polarization in correspondence with the intensity of the transmitted current, causing a corresponding amount of light to pass through the analyzer 34, the light so transmitted being reflected by the reflector 21 aforesaid in a beam which covers the field of view of the receiving apparatus, this beam being, however, intercepted by the disc 1 and only that portion of the beam which is momentarily in line with the aperture 11 being allowed to pass. Any other suitable receiving means may be used. For example, the means shown in Fig. 10 and comprising a vacuum tube or bulb 38 adapted to produce cathode rays and thereby to effect fluorescence of a suitable surface; said tube being provided, for example, with a cathode 9 and anode 40 having an aperture 41 through which cathode rays pass to a diaphragm 42, said diaphragm having a slit or aperture 43 located in the path of said rays. An electro-magnet 44 connected to and controlled by transmission line 26 is mounted in the tube 38 in such manner as to deflect the cathode rays in their passage between apertures 41 and 43 and thereby enable the diaphragm 42 to cut off more or less of such rays, the parts being so positioned and constructed that the amount of light which is permitted to pass through the slit 43 will be proportioned to the intensity of current in the transmission line 26. The rays which pass through the slit 43 in the diaphragm 42 eventually reach a plate 47 consisting of, or coated with suitable fluorescent material such as platino-cyanide of barium, said fluorescent plate being so positioned that rays therefrom will be received and collected by the lens 22 aforesaid of the receiver and will thereby be directed to the reflector 21, which reflects such rays through the pin hole 10 which is for the time being passing the field of view of the receiving apparatus.

I prefer to employ synchronizing means for the operating devices above described, which are controlled photoelectrically and which utilize to a large extent the same transmitting and receiving devices which effect the transmission of the view itself. The synchronizing devices at the transmitting end may comprise two illuminating devices, each consisting, for example, of an electric lamp 48 mounted in a pocket 49, there being one of such illuminating devices at each side of the field of view indicated at $a$ of the receiving apparatus and in line with the median line $b$—$b$ of said field of view. The reciprocating motion of the disc 1 is made sufficiently extensive to bring the apertures 11 in said disc opposite the respective illuminating devices at the respective ends of the stroke thereof, such apertures thus passing beyond said field of view at each end of the stroke for a small portion of the period of reciprocation. During such passage of the apertures 11 in front of either of the said illuminating devices, light from such devices will pass through such aperture and will be reflected by reflector 21 to the transmitter 24, the beam of light passing in this manner being preferably of greater intensity than that received from any part of the "view" which is to be transmitted, so as to send over the transmitting line at each end of the stroke or reciprocation of the selecting disc 1 a sharp, relatively strong, impulse adapted for the synchronizing action at the receiving station. The receiving station is provided at each side of the field of view thereof with two light receiving means such as selenium cells 50 and 51 located respectively somewhat above and somewhat below the median line of the field of view and in the path of the beams passing through the apertures 11 at the respective ends of the reciprocating stroke of the selecting disc 1 for the receiving apparatus. Said light receiving means 50 and 51 are connected to suitable means for controlling the operation of the motor 6 for the receiving apparatus. For this purpose the shaft 5 of said motor may be provided with a friction disc 53 on which bears a brake 54. Said brake is pivoted at 55 and is connected to armatures 56 and 57 of respective electro-magnets 58 and 59, said electro-magnets being connected respectively in the circuits 60 and 61, each of such circuits including one of the light receiving means 50 or 51 and a suitable source of current such as a battery 62 which may be located in a common return for the said two circuits 60 and 61. The brake means 54 is normally held against the brake disc 53 by spring means 64, and the armatures 56 and 57 are arranged in such manner that operation of armature 56 by electro-magnet 58 will reduce the brake pressure of brake 54 on disc 53 while the operation of electro-magnet 59 on armature 57 will increase the pressure of the brake means 54 on disc 53 so as to retard the driving motor of the receiving apparatus. A manual control means such as a thumb screw 65 is also provided for adjusting the pressure of the brake.

The process of transmission may be carried out in the above described apparatus in the following manner:

Rays from the visual object or scene to be transmitted are directed by lens 30 or other suitable means in such manner as to form an image of the object at or adjacent to the peripheral portion of the selective disc 1 and within the field of view of the apparatus, such field of view being indicated by the dotted square a in Fig. 1. The disc 1 of the transmitting apparatus is set in rapid rotation and at the same time is caused to reciprocate back and forth so that the pinholes or other apertures 11 in the said disc traverse the said field of view in parallel lines concentric to the axis of the rotation of the disc, successive lines being displaced a distance corresponding to the lateral movement of the disc in the period between passage of two successive apertures 11 across the field of view, such spacing of the lines of travel of the apertures being sufficiently close together to provide for the desired detail in the reproduction of the view and the period of oscillation or reciprocation of the disc being sufficiently short to enable the apertures to cover the entire field of view with such rapidity that the effect to the eye is that of a continuous exposure of the entire view. For this purpose the reciprocations of the disc should be not less than 16 strokes per second. The arm or tube 18 together with the light receiving means contained therein and comprising reflector 21 and lens 22 are also caused to move with the selector disc 1 in its oscillatory movement so as to always maintain the same relative position with respect to the path of the apertures 11 across the field of view. At the end of each stroke the apertures 11 in the disc come opposite the corresponding synchronizing illuminating means 48 and at each passage of an aperture in front of said illuminating means a ray of light from the latter passes through said aperture and is reflected by the reflector 21 through the lens 22 on to the transmitter 24, causing such variation of resistance in the said transmitter as to cause an electric current impulse to pass over the line wire 26 either directly or by inductive or relay action. The receiving apparatus being set in motion in the same manner as the transmitting apparatus, the apertures 11 in said receiving apparatus traverse the field of view thereof and at each end of the stroke pass the synchronizing photo-sensitive cells 50 and 51, and the arm or tube 18 and its light projecting means consisting of the lens 22 and reflector 21 are also caused to oscillate with disc 1. The relatively strong synchronism impulses passing over the line from the transmitter as above described cause production of relatively strong rays from the receiver of the receiving apparatus, such rays being directed by the lens 22 and reflector 21, of such apparatus through pin holes 11 of the disc 1. If the receiving apparatus is considerably out of synchronism with the transmitting apparatus, the light flashes pass through the apertures or pin holes 11 in the receiving apparatus in this manner at times when the apertures are traversing the field of view of the receiver and will be visible to an operator at the receiving station either by direct vision or through the lens 40 or on a suitable receiving screen covering the field of view adjacent to the selector disc 1. The operator will then adjust the manual control means 65 so as to retard or accelerate the motor of the receiving apparatus until the flashes from the apertures 11 no longer appear in the field of view, the corresponding current impulses taking place when the said apertures are passing the photo sensitive devices 50 or 51 at one side or other of the field of view. A switch 64 in the circuit of battery 62 is then closed, so that the apparatus is then left under the control of the automatic synchronizing means which operates as follows:

Assuming that the selective disc 1 of the receiving apparatus is rotating in the direction indicated by the arrow and that it is rotating in approximately exact synchronism with the selective disc 1 of the transmitting apparatus, each aperture 11 of the receiver will pass the median line of the field of view at approximately the same instant that a synchronized impulse is transmitted from the illuminating device 48 located at such median line at the transmitter. In the receiving apparatus the two photosensitive devices are located respectively somewhat below and somewhat above the said median line position so that if the synchronized impulse arrives at approximately the same time that aperture 11 is passing median line there will be no effect on the photo-sensitive means, but if the receiving apparatus is lagging slightly so that the flash due to synchronized impulse passes at a moment when an aperture 11 is sufficiently above the median line, it causes such flash to act on the photo-sensitive cell 50, and the electromagnetic device controlled by such cell operates the corresponding braking means to relieve the brake pressure and permit the motor to slightly accelerate. In case the selector disc of the receiving apparatus is moving slightly in advance of synchronism, the reverse effect will take place so that any appreciable departure of the receiving apparatus from synchronism with the transmitting apparatus is followed by instantaneous correction.

During a certain portion of each stroke, the pin hole apertures 11 are passing over the fields of view of the transmitting and receiving apparatus in such manner as to occupy substantially the same positions relative to respective fields of view and the illumination produced at the field of view in the receiving station, therefore, depends upon and corresponds to the illumination at the corresponding part of the field of view at the transmitting station; thus assuming that an aperture 11 in the selector disc of the transmitting apparatus is momentarily passing a certain point in the field of view of such apparatus where a certain light intensity is present and a ray of light proportional to such intensity will pass through the aperture and be reflected by reflector 21 through lens 22 on to the photo-sensitive cell 24 with the result that an electric impulse passes over the transmission line 26 proportional in amplitude to the intensity of such ray of light. By the receiving means above described such electric impulse is caused to produce a ray of light at the receiving station which passes through the lens 22 and is reflected by the reflector 21 through the aperture 11 which at that moment is occupying a corresponding position to the light receiving aperture of the disc 1 and transmitting apparatus, and as this operation takes place successively for each minute portion of the field of view, there is reproduced at the receiving station a visual image corresponding to the view projected on to the field of view at the transmitting apparatus.

It will be understood that the current impulses transmitted to the lines above described and corresponding to the light intensity at successive portions of the scene being transmitted, may be caused to control any suitable electro-transmission means, for example, such as those employed in wireless telephony, so as to produce radiations corresponding in strength to the electrical impulses so produced and such radiations may be utilized at the receiving station to control an electrical circuit which operates upon the receiving means in the same manner as above described.

With the above described operation only a portion of the period representing a complete cycle of operations is utilized in transmitting the scene, the remaining portion, namely, at the ends of the stroke being utilized to send and receive synchronizing impulses.

What I claim is:

1. In a television apparatus, a transmitting device comprising an opening defining a field of view, a selector member mounted to rotate on a shaft and provided with a plurality of minute apertures defining a circle concentric with said shaft and adapted to pass adjacent said defining opening and across the field of view defined thereby upon rotation of said selector member, driving means for rotating said selector member so as to cause the apertures thereof to pass successively across said field of view, driving means for producing oscillatory movement of the selector member so that successive apertures are caused to pass across different portions of the field of view, a light receiving means so mounted as to move with the selector member in its oscillatory movement, photo-electric means, said light receiving means being adapted to receive light rays transmitted through an aperture of the selector member as it passes across the field of view and to direct such rays upon the photo-electric means, and electrical transmitting means controlled by said photo-electric means in such manner as to transmit electrical impulses corresponding in intensity to the light rays directed upon the photo-electric means.

2. A construction as set forth in claim 1, and comprising in addition means operatively connecting the driving means for rotating the selector member and the driving means for producing oscillatory movement thereof, so as to maintain a definite relation between the speed of rotation and the frequency of oscillation.

3. In a television apparatus, a receiving device comprising an opening defining a field of view, a selector member mounted to rotate on a shaft and provided with a plurality of minute apertures defining a circle concentric with said shaft and adapted to pass adjacent said defining opening and across the field of view defined thereby upon rotation of said selector member, driving means for rotating said selector member so as to cause the apertures thereof to pass successively across said field of view, driving means for producing oscillatory movement of the selector member so that successive apertures are caused to pass across different portions of the field of view, a light projecting means so mounted as to move with the selector member in its oscillatory movement, electrically controlled light emitting means, said projecting means being adapted to project light rays from said light emitting means through an aperture of the selector member as it passes across the field of view, and electrical receiving means controlling said light emitting means adapted to receive variable electrical impulses and to cause said light emitting means to emit light rays corresponding in intensity to such electrical impulses.

4. A construction as set forth in claim 3, and comprising in addition means operatively connecting the driving means for rotating the selector member and the driving means for producing oscillatory movement thereof, so as to maintain a definite relation between the speed of rotation and the frequency of oscillation.

5. A television apparatus comprising a transmitting device and a receiving device; each of said devices comprising an opening defining a field of view, a selector member mounted to rotate on a shaft and provided with a plurality of apertures defining a circle concentric with said shaft and adapted to pass adjacent said defining opening and across the field of view defined thereby upon rotation of said selector member, driving means for rotating said selector member so as to cause the apertures thereof to pass successively across said field of view, and driving means for producing oscillatory movement of the selector member so that successive apertures are caused to pass across different portions of the field of view; and said transmitting device further comprising a light receiving means so mounted as to move with the corresponding selector member in its oscillatory movement and provided with photo-electric means, said light receiving means being adapted to receive light rays transmitted through an aperture of such selector member as it passes across the field of view and to direct such rays upon the photo-electric means, and electrical transmitting means controlled by said photo-electric means in such manner as to transmit electrical impulses corresponding in intensity to the light rays directed upon the photo-electric means; and said receiving device further comprising light projecting means so mounted as to move with the corresponding selector member in its oscillatory movement and provided with electrically controlled light emitting means, said projecting means being adapted to project light rays from said light emitting means through an aperture of such selector member as it passes across the field of view, and electrical receiving means controlling said light emitting means and adapted to receive the variable electrical impulses transmitted by said electrical transmitting means and to cause said light emitting means to emit light rays corresponding in intensity to such electrical impulses.

6. In a television apparatus, a transmitting device comprising an opening defining a field of view, a selector member mounted to rotate on a shaft and provided with a plurality of minute apertures defining a circle concentric with said shaft and adapted to pass adjacent said defining opening and across the field of view defined thereby upon rotation of said selector member, driving means for rotating said selector member so as to cause the apertures thereof to pass successively across said field of view, driving means for producing oscillatory movement of the selector member so that successive apertures are caused to pass across different portions of the field of view, a light receiving and directing means on the other side of said selector member from said defining opening and extending diametrically of said selector member and so mounted as to move with said member in its oscillatory movement, said light receiving and directing means being provided with a reflector member inclined to the axis of rotation of the selector member and concentric with said axis and adapted to receive all light rays transmitted through an aperture of the selector member while passing across said field of view and to direct said rays longitudinally of said light receiving and directing means, photo-electric means located in the path of the light rays so directed, and electrical transmitting means controlled by said photo-electric means in such manner as to transmit electrical impulses corresponding in intensity to such light rays.

7. In a television apparatus, a receiving device comprising an opening defining a field of view, a selector member mounted to rotate on a shaft and provided with a plurality of minute apertures defining a circle concentric with said shaft and adapted to pass adjacent said defining opening and across the field of view defined thereby upon rotation of said selector member, driving means for rotating said selector member so as to cause the apertures thereof to pass successively across said field of view, driving means for producing oscillatory movement of the selector member so that successive apertures are caused to pass across different portions of the field of view, a light receiving and projecting means on the other side of said selector member from said defining opening and extending diametrically of said selector member and so mounted as to move with said selector member in its oscillatory movement, electrically controlled light emitting means located so as to emit light longitudinally into said light receiving and projecting means, said light receiving and projecting means being provided with a reflector member inclined to the axis of rotation of said selector member and concentric with said axis and adapted to receive light rays from said light emitting means and to project such light rays with equal effectiveness through an aperture of said selector which is passing across any portion of said field of view, and electrical receiving means controlling said light emitting means and adapted to receive variable electrical impulses and to cause said light emitting means to emit light rays corresponding in intensity to such electrical impulses.

8. A television apparatus comprising a transmitting device and a receiving device; each of said devices comprising means defining a field of view, a movable selector member provided with apertures, and with means for driving said member, the movement of such selector member being adapted to cause said apertures to successively register with different parts of the corresponding field of view during a portion of such movement and to register with synchronizing means mounted adjacent the means defining such field of view during another portion of such movement, the latter portion of such movement occurring simultaneously in both devices; said transmitting device further comprising means for receiving light rays passing through said apertures in its selector member, photo-electric means in the path of such light rays, and electrical transmitting means controlled by said photo-electric means so as to transmit electrical impulses corresponding in intensity to such light rays; and said receiving device further comprising means for receiving such electrical impulses, means controlled by such impulses and adapted to emit light rays corresponding in intensity thereto, and means for projecting such light rays through an aperture in the corresponding selector member; said synchronizing means of the transmitting device comprising a source of light rays, and said synchronizing means of the receiving device comprising photo-electric means and electrically operated means controlled by said photo-electric means and adapted to regulate the speed of the movement of the receiving selector member and to cause it to synchronize with the transmitting selector member.

9. A television apparatus comprising transmitting and receiving stations, each provided with means defining a field of view, with selector means for causing light rays to periodically traverse different portions of said field of view and to periodically traverse zones external to said field of view alternately with the traversal of the field of view and synchronizing means controlled by such light rays during the traversal thereof of such zones external to the field of view and adapted to control the operation of said selector means to synchronize the selector means at the transmitting and receiving stations.

10. An apparatus for synchronizing electrical television apparatus comprising transmitting and receiving stations, said synchronizing apparatus comprising means defining a synchronizing zone at each station, selector means at each station adapted to periodically traverse such synchronizing zone, and means for synchronizing the operation of said selector means at the transmitting and receiving station including means at each station for generating light rays and for directing such light rays to the respective selector means in the corresponding synchronizing zones, means at one of said stations responsive to light rays selected by the corresponding selector means in said synchronizing zone and adapted to transmit electrical impulses corresponding to such light rays, means at the other station responsive to such electrical impulses and adapted to control the light rays directed to the selector means in the synchronizing zone at such station, and means at such other station responsive to such light rays selected by the selector means to control and synchronize the operation of the selector means.

11. A television apparatus comprising transmitting and receiving stations each provided with means defining a field of view and defining a synchronizing zone external to the field of view, selector means adapted to periodically direct light rays corresponding to an object to be visually reproduced successively to different portions of the said field of view, means at the transmitting station for directing light rays from such object to the corresponding selector means, means at the receiving stations for generating light rays and directing them to the corresponding selector means, means at the receiving station for directing the light rays selected by the corresponding selector means to reproduce visually the object aforesaid, electrical communicating means responsive to the operation of the light rays selected by the selector means at the transmitting station for controlling the generation of light rays at the receiving station, means for operating said selector means at the transmitting and receiving stations, and means for synchronizing such operation of the selector means at the transmitting and receiving station including means for generating light rays at the transmitting and receiving stations and for directing such light rays to the respective selector means in the aforesaid synchronizing zones, the aforesaid electrical communicating means being also responsive to control by the light rays selected in the synchronizing zone of one of said stations and means responsive to the operation of said electrical communicating means to control the operation of the synchronizing means at the other station.

12. In combination with an apparatus for electrical communication comprising a transmitting device and a receiving device each provided with driving means, means for synchronizing said driving means, comprising a selector member mounted to permit rotation and oscillation thereof and means operable by the driving means of the transmitting device for rotating and oscillating said selector member, a plurality of apertures in said selector member, a source of light rays so positioned that said apertures intermittently register with said source of light rays and permit passage of said light rays therethrough in the movement of the selector member, means for receiving light rays thus permitted to pass through said apertures, photo-electric means in the path of the light rays so received, electrical transmitting means controlled by said photo-electric means so as to intermittently transmit electrical impulses corresponding to such light rays, means at the receiving device for receiving such electrical impulses, means controlled by said impulses and adapted to emit light rays corresponding thereto, a second selector member mounted to permit rotation and oscillation thereof and means operable by the driving means for the receiving device for rotating and oscillating the same, a plurality of apertures in said second selector member, means for projecting the light rays from said light ray emitting means through said apertures in the second selector member, photo-electric means so positioned that said apertures in the second selector member intermittently register therewith in the movement of the second selector member, and electrically operated means controlled by said photo-electric means and adapted to regulate the speed of the driving means for the receiving device so as to synchronize the same with the driving means for the transmitting device.

13. In combination with an apparatus for electrical communication comprising a transmitting device and a receiving device, means for synchronizing the operation of said devices, comprising a selector member operatively connected to each of said devices and provided with means for periodically causing light rays to traverse a synchronizing zone, photo-electric means at the transmitting device responsive to the light rays traversing the corresponding synchronizing zone and adapted to transmit electrical impulses corresponding thereto, means at the receiving device responsive to such electrical impulses and adapted to control the light rays traversing the corresponding synchronizing zone, photo-electric means at the receiving device responsive to the light rays traversing the synchronizing zone and electrically operated means controlled by said photo-electric means and adapted to control the operation of the receiving device.

In testimony whereof I have hereunto subscribed my name this 20th day of May, 1922.

RUDOLPH A. DALLUGGE.